(12) United States Patent
Lee et al.

(10) Patent No.: US 9,793,567 B2
(45) Date of Patent: Oct. 17, 2017

(54) ION EXCHANGE MEMBRANE, METHOD OF PREPARING THE SAME, AND REDOX FLOW BATTERY COMPRISING THE SAME

(71) Applicant: Samsung Electronics Co., Ltd., Suwon-si, Gyeonggi-do (KR)

(72) Inventors: Myungjin Lee, Seoul (KR); Moonsung Kang, Yongin-si (KR); Dooyeon Lee, Yongin-si (KR); Dohyeong Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 374 days.

(21) Appl. No.: 14/529,509

(22) Filed: Oct. 31, 2014

(65) Prior Publication Data

US 2015/0125729 A1    May 7, 2015

(30) Foreign Application Priority Data

Nov. 1, 2013    (KR) .......................... 10-2013-0132531

(51) Int. Cl.
| | |
|---|---|
| *H01M 8/10* | (2016.01) |
| *H01M 8/18* | (2006.01) |
| *H01M 8/20* | (2006.01) |
| *H01M 8/1023* | (2016.01) |
| *H01M 8/106* | (2016.01) |

(52) U.S. Cl.
CPC ............. *H01M 8/20* (2013.01); *H01M 8/106* (2013.01); *H01M 8/1023* (2013.01); *H01M 8/188* (2013.01); *H01M 2300/0082* (2013.01); *Y02E 60/528* (2013.01)

(58) Field of Classification Search
CPC .... H01M 8/1023; H01M 8/106; H01M 8/188; H01M 8/20; H01M 2300/0082; Y02E 60/528
See application file for complete search history.

(56) References Cited

U.S. PATENT DOCUMENTS

| | | |
|---|---|---|
| 6,764,789 B1 | 7/2004 | Sekiguchi et al. |
| 2010/0266928 A1* | 10/2010 | Fukuta .................. H01B 1/122 429/480 |

(Continued)

FOREIGN PATENT DOCUMENTS

| | | |
|---|---|---|
| JP | 2009203455 A | 9/2009 |
| JP | 2010086935 A | 4/2010 |

(Continued)

*Primary Examiner* — Brittany Raymond
(74) *Attorney, Agent, or Firm* — Cantor Colburn LLP (57) ABSTRACT

An ion exchange membrane for a redox flow battery, the anion exchange membrane including a porous substrate; and a polymer disposed in the porous substrate, wherein the polymer is a polymerization product of a composition for forming the ion exchange membrane, wherein the composition includes a first monomer and a second monomer, wherein the first monomer is substituted with a group including an ethylenic unsaturated double bond and includes a cationic heterocyclic compound including a nitrogen heteroatom and a counter anion thereof, and wherein the second monomer is polymerizable with the first monomer and is at least one selected from a (meth)acrylamide compound and a (meth)acrylate compound.

11 Claims, 3 Drawing Sheets

(56) References Cited

U.S. PATENT DOCUMENTS

2011/0281197 A1 11/2011 Daikoku et al.
2012/0115069 A1 5/2012 Noack et al.
2013/0264209 A1* 10/2013 Kwon .................. C02F 1/4695
            204/638

FOREIGN PATENT DOCUMENTS

| KR | 1020100106985 A | 10/2010 |
| KR | 1020110088881 A | 8/2011 |
| KR | 10-1163996 B1 | 7/2012 |
| KR | 1020130049077 A | 5/2013 |
| KR | 10-1351280 B1 | 1/2014 |

* cited by examiner

After filling

ION EXCHANGE MEMBRANE, METHOD OF PREPARING THE SAME, AND REDOX FLOW BATTERY COMPRISING THE SAME

RELATED APPLICATION

This application claims priority to and the benefit of Korean Patent Application No. 10-2013-0132531, filed on Nov. 1, 2013, in the Korean Intellectual Property Office, and all the benefits accruing therefrom under 35 U.S.C. §119, the content of which is incorporated herein in its entirety by reference.

BACKGROUND

1. Field

The present disclosure relates to an ion exchange membrane, methods of manufacturing the ion exchange membrane, and redox flow batteries including the ion exchange membrane, and more particularly, to ion exchange membranes having excellent ion mobility and film properties, methods of manufacturing the ion exchange membrane, and redox flow batteries including the ion exchange membrane.

2. Description of the Related Art

A secondary battery is a highly efficient energy storage system which may be used for various devices ranging from small mobile apparatuses to medium to large scale energy storage systems. A redox flow battery as a secondary battery has received much attention due to its high output and durability that make it suitable for large scale power storage systems that provide high energy storage density.

Unlike other types of batteries, the redox flow battery includes an active material in a liquid state instead of a solid state and has a mechanism for generating and storing electrical energy through a redox reaction of ions in each of the catholyte and the anolyte. In other words, in the redox flow battery, the active material is dissolved in a solvent so that it is in solution, and when the redox flow battery including a catholyte and an anolyte having different oxidation numbers is charged, ions in the catholyte and anolyte solutions undergo an oxidation reaction and a reduction reaction at a contact surfaces of the cathode and the anode, respectively. An electromotive force of the battery can be determined by a difference in a standard electrode potential) ($E°$ of the redox couple included the catholyte and the anolyte.

Also, the catholyte and the anolyte, which are in a liquid state in the redox flow battery, are separated by an ion exchange membrane disposed therebetween. In the redox flow battery, the ion exchange membrane does not directly participate in a reaction, but acts to (i) rapidly deliver ions, which are charge carriers, to a space between the catholyte and the anolyte, (ii) separate the cathode and the anode to prevent a direct contact between the cathode and the anode, and (iii) inhibit crossover between the electrolyte active ions that are dissolved in the catholyte and the anolyte and directly participate in the reaction.

An ion exchange membrane that has been used in the redox flow battery is aqueous. In other words, ion mobility and film properties of the ion exchange membrane are optimized in the redox flow battery using an aqueous electrolyte. However, when using an aqueous system, a driving potential of the aqueous redox flow battery is limited by a water splitting potential, and thus, a driving voltage and energy density of the aqueous redox flow battery are low. Thus, there is a need for an ion exchange membrane having ion mobility and film properties suitable for use in a non-aqueous redox flow battery.

SUMMARY

Provided is an anion exchange membrane having ion mobility and film properties suitable for a redox flow battery including a non-aqueous electrolyte.

Provided are methods of manufacturing the ion exchange membrane.

Provided is a redox flow battery including the ion exchange membrane.

Additional aspects will be set forth in part in the description which follows and, in part, will be apparent from the description.

According to an aspect, provided is an anion exchange membrane for a redox flow battery, the anion exchange membrane including: a porous substrate; and a polymer disposed in the porous substrate, wherein the polymer is a polymerization product of a composition for forming an ion exchange membrane, the composition including a first monomer and a second monomer, wherein the first monomer is substituted with a group including an ethylenic unsaturated double bond and includes a cationic heterocyclic compound including a nitrogen heteroatom and a counter anion thereof, and wherein the second monomer is polymerizable with the first monomer and is at least one selected from a (meth)acrylamide compound and a (meth)acrylate compound.

According to another aspect, provided is a method of manufacturing an anion exchange membrane for a redox flow battery, the method including: immersing a porous substrate into a composition for forming the ion exchange membrane; and polymerizing the composition to form the ion exchange membrane, wherein the composition for forming the ion exchange membrane comprises a first monomer and a second monomer, wherein the first monomer is substituted with a group comprising an ethylenic unsaturated double bond and comprises a cationic heterocyclic compound comprising a nitrogen heteroatom and a counter anion thereof, and wherein the second monomer is polymerizable with the first monomer and is at least one selected from a (meth)acrylamide compound and a (meth)acrylate compound.

According to another aspect, provided is a redox flow battery including: a cathode cell comprising a cathode and a catholyte; an anode cell comprising an anode and an anolyte; and the anion exchange membrane, wherein the anion exchange membrane is disposed between the cathode cell and the anode cell.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Alkenyl" means a straight or branched chain, monovalent hydrocarbon group having at least one carbon-carbon double bond (e.g., ethenyl (—HC=CH$_2$)).

Hereinafter, embodiments will are disclosed in greater detail.

An anion exchange membrane according to an embodiment includes a porous substrate; and a polymer disposed in the porous substrate, wherein the polymer is prepared from a composition for forming an ion exchange membrane, wherein the composition comprises a first monomer and a second monomer; wherein the first monomer is substituted with a group including an ethylenic unsaturated double bond, and includes a cationic heterocyclic compound including nitrogen as a heteroatom and a counter anion thereof, and wherein the second monomer is polymerizable with the first monomer and is at least one selected from a (meth)acrylamide-based compound and a (meth)acrylate-based compound.

As used herein, the term "composition for forming an ion exchange membrane" refers to a composition that is disposed in a porous substrate having ion exchangeability to form an ion exchange membrane, as is further disclosed below.

The heterocyclic compound of the first monomer may be a saturated or an unsaturated compound in which 5 to 6 atoms form a heterocyclic structure.

Also, the heterocyclic compound may include 1, 2, or 3 nitrogen atoms as a heteroatom, and examples of the cationic heterocyclic compound include pyridinium, pyrimidinium, pyrazinium, imidazolium, pyrazolium, and triazolium. The heterocyclic compound may include a heteroatom other than nitrogen, such as sulfur (S) or oxygen (O).

Examples of the groups substituted with the heterocyclic compound include groups including ethylenic unsaturated double bond, for example, an alkenyl group.

A detailed example of the cationic heterocyclic compound substituted with the ethylenic unsaturated double bond and including nitrogen as a heteroatom is the imidazolium of Formula 1:

Formula 1

In Formula 1, $R^1$ to $R^5$ are each independently hydrogen, a C1-C10 alkyl group, or a C2-C10 alkenyl group, wherein, at least one of $R^1$ to $R^5$ is a C2-C10 alkenyl group. For example, $R^1$, $R^4$, and $R^5$ may be hydrogen, one of $R^2$ and $R^3$ may be a C1-C10 alkyl group, and the other of $R^2$ and $R^3$ may be a C2-C10 alkenyl group. The C1-C10 alkyl group may be, for example, a C1-C5 alkyl group, which may be linear or branched. Also, the C2-C10 alkenyl group as used herein may be, for example, a C2-C5 alkenyl group, which may be linear or branched.

The counter anion of the first monomer is not particularly limited and may be any suitable anion that may form an ionic bond with the cationic heterocyclic compound. The counter anion may be, for example, any one selected from $BF_4^-$, $Cl^-$, $Br^-$, $I^-$, $SO_4^-$, $PF_6^-$, $ClO_4^-$, $CF_3SO_3^-$, $(CF_3SO_2)_2N^-$, and $(C_2F_5SO_2)_2N^-$. The counter anion may be the same anion as the anion used in the electrolyte.

When an aqueous cation exchange membrane is used, a cation, e.g., $Na^+$, $Li^+$, and $H^+$, may be used as a charge carrier. However, the solubility of the salt is low in a non-aqueous solvent, and when a small amount of water is added to increase the solubility, the electrolyte may become unstable, such that a redox reaction is not completely reversible. On the other hand, when a non-aqueous anion exchange membrane is used, a salt having high solubility may be introduced in an organic solvent, such that water may be effectively completely removed to make the redox reaction reversible, thereby improving the cycle and voltage properties. Also, when the counter anion is the same anion as the anion used in the electrolyte, selectivity with respect to the anion, which is used as the charge carrier in the electrolyte, may increase, thereby improving the electrical conductivity.

The second monomer included in the composition for forming the ion exchange membrane may polymerize with the first monomer to increase a strength and ion exchange capacity of the ion exchange membrane.

The second monomer may be at least one of the (meth) acrylamide-based compound and the (meth)acrylate-based compound. For example, the second monomer may be selected from N,N-dimethylacrylamide, N,N-diethylacrylamide, N—(N,N-dimethylamino)ethyl acrylamide, N,N-dimethylaminopropylacrylamide, and N,N-diethylaminopropylacrylamide, which may be used alone or as a combination comprising at least one of the foregoing.

An amount of the second monomer may be suitably selected according to the type of the first monomer and performance desired of the ion exchange membrane. In the composition for forming the ion exchange membrane, the second monomer may be included in an amount of 0.5 moles to about 4 moles, based on 1 mole of the first monomer, for example, about 1 mole to about 3 moles or about 1 mole to about 2 moles based on 1 mole of the first monomer. When the amount of the second monomer is in the range described above, a polymerization between the first monomer and the second monomer may occur sufficiently in a pore filling part of the ion exchange membrane, and a strength and an ion exchange capacity of the ion exchange membrane may improve in a balanced manner.

The composition for forming the ion exchange membrane may further include a cross-linking agent. The cross-linking agent improves ion selectivity and physical/chemical stability and durability of the ion exchange membrane.

The cross-linking agent may be a compound including two or more polymerizable functional groups. For example, the cross-linking agent may comprise at least one selected from a bis((meth)acrylamide)-based compound and a di(meth)acrylate-based compound, and detailed examples thereof include ethylene glycol di(meth)acrylate, N',N-methylene bis(meth)acrylamide), 1,3-butanediol di(meth) acrylate, 1,6-hexanediol di(meth)acrylate, bisphenol A dimethacrylate, diethylene glycol di(meth)acrylate, triethylene glycol di(meth)acrylate, and diurethane dimethacrylate.

The cross-linking agent may be used alone or as a combination comprising at least one of the foregoing.

An amount of the cross-linking agent may be suitably selected according to the types of the first monomer and the second monomer and performance of the desired ion exchange membrane. The cross-linking agent may be included in an amount of less than 10 wt %, based on a total weight of the monomers, for example, a total weight of the first monomer and the second monomer in the composition for forming the ion exchange membrane. When the amount of the cross-linking agent is in the range disclosed above, the ion selectivity and physical/chemical stability and durability of the ion exchange membrane may be more improved.

The composition for forming the ion exchange membrane may further include at least one of the solvent and a polymerization initiator.

The solvent may be a non-aqueous solvent. When the non-aqueous solvent is used, a separate drying process of the solvent can be avoided for a non-aqueous redox flow battery, which is advantageous because it not only simplifies the manufacturing process but also prevents shrinkage or expansion of a polymer, which usually occurs during the drying process, and thereby prevents the occurrence of minute cracks and pin-holes. The non-aqueous solvent may be, for example, at least one selected from dimethyl acetamide, diethyl carbonate, dimethyl carbonate, acetonitrile, γ-butyrolactone ("GBL"), propylene carbonate ("PC"), ethylene carbonate ("EC"), N-methyl-2-pyrrolidone ("NMP"), fluoroethylene carbonate, N,N-dimethylacetamide, and adiponitrile ("ADPN").

An amount of the solvent may be, for example, more than 0 wt % and less than 30 wt %, for example, more than 0 wt % and less than 10 wt %, or 0.1 wt % to 30 wt %, based on the total weight of the composition for forming the ion exchange membrane. When the amount of the solvent is within the range described above, a drying time may be shortened during the polymerization of the composition for forming the ion exchange membrane and uniform film properties may be obtained.

The polymerization initiator may be a heat polymerization initiator or a light polymerization initiator.

The heat polymerization initiator may include at least one selected from benzoyl peroxide, potassium persulfate, ammonium persulfate, sodium persulfate, ammonium bisulfate, sodium bisulfate, azobisisobutyronitrile, 1,1'-azobis(1-methylbutyronitrile-3-sodium sulfonate), and 4,4'-azobis(4-cyanovaleric acid).

The light polymerization initiator may include at least one selected from benzophenone, 2,2-dimethoxy-2-phenylacetophenone, 2-oxoglutaric acid, 1-hydroxycyclohexyl phenyl methanone, and 2-hydroxy-2-methyl-propiophenone.

An amount of the polymerization initiator may be about 1 wt % to about 5 wt %, for example, about 1 wt % to about 3 wt %, based on the total weight of the composition for forming the ion exchange membrane.

Hereinafter, a method of manufacturing the ion exchange membrane according to an embodiment will be disclosed in greater detail with reference to FIG. 1.

Figure 1:
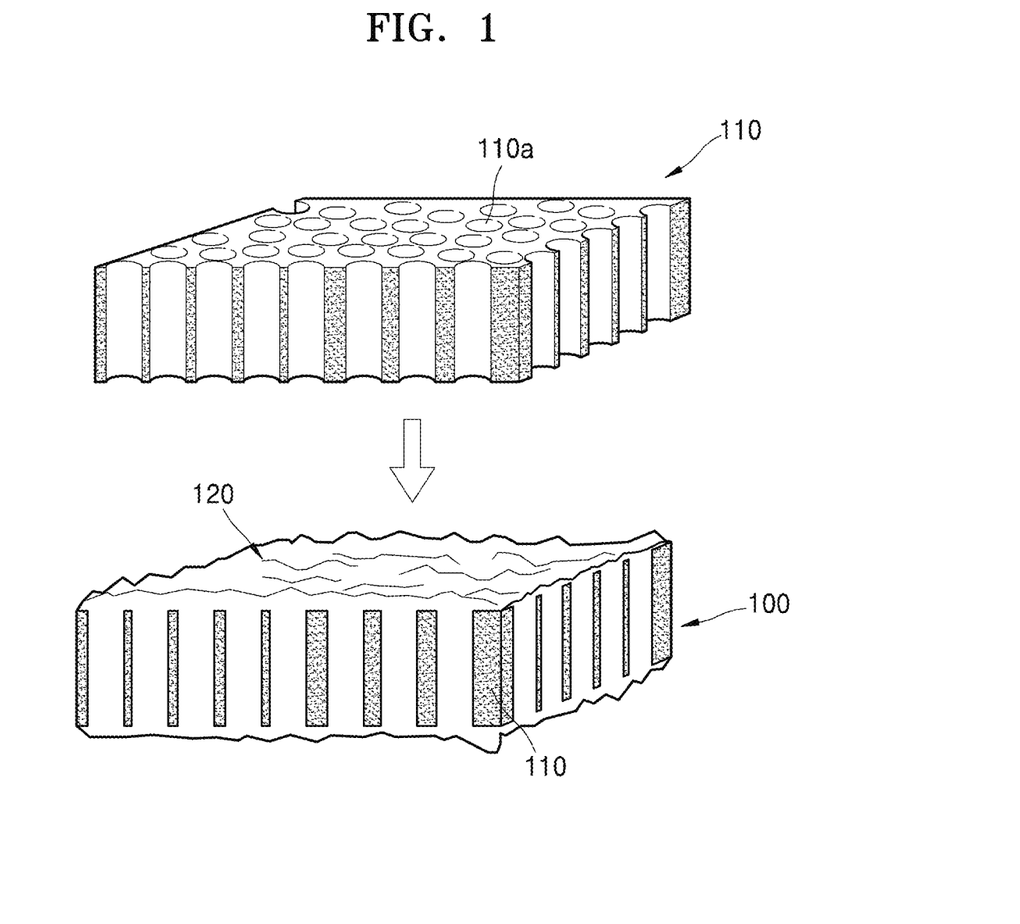
FIG. 1 illustrates an embodiment of a method of manufacturing an ion exchange membrane.

Referring to FIG. 1, the method of manufacturing the ion exchange membrane according to an embodiment includes immersing a porous substrate 110 into the composition for forming the ion exchange membrane 120 described above, and polymerizing the composition for forming the ion exchange membrane 120.

The porous substrate 110 may include at least one compound selected from the group consisting of polyolefin, polytetrafluoroethylene, polyetheretherketone, polysulfone, polyimide, and polyamideimide. The porous substrate may have a pore 110a having a size of about 0.01 micrometer (μm) to about 0.1 μm. Also, the porous substrate 110 may have a thickness of about 50 μm or less, for example, about 30 μm or less, or 1 μm to 50 μm. When the thickness of the porous substrate 110 is in the range described above, a film resistance may be reduced.

After the immersing process, the method of manufacturing the ion exchange membrane may additionally include sorping, e.g., adsorbing or absorbing, the composition for forming the ion exchange membrane onto the porous substrate. The sorping process may be performed by, for example, maintaining the porous substrate in the composition for forming the ion exchange membrane for about 20 minutes to about an hour, while shaking the composition for forming the ion exchange membrane.

After the immersing process (and if the sorping process is performed, after the sorping process), the porous substrate may be taken out and an unreacted composition for forming the ion exchange membrane therein may be removed and then the polymerization process may be performed. The polymerization may be performed by the heat polymerization or the light polymerization. As an example, when the composition for forming the ion exchange membrane is heat polymerized, the heat polymerization process may be performed for about 4 hours to about 12 hours at a temperature of about 60° C. to about 100° C. As another example, when the composition for forming the ion exchange membrane is light polymerized, the light polymerization process may occur at room temperature (for example, about 20° C. to about 30° C.) under irradiation of ultraviolet rays for about 0.3 hours to about 2 hours.

The method of manufacturing the ion exchange membrane according to an embodiment includes direct polymerization when the first monomer and the second monomer, each including an anion exchanger, are disposed in the porous substrate, and thus, the method can avoid use of a separate process for introducing the anion exchanger through a post-treatment after the polymerization. The method also can avoid use of a drying process after the polymerization because the composition for forming the ion exchange membrane may include the non-aqueous solvent. Accordingly, manufacturing the ion exchange membrane is simplified.

While not wanting to be bound by theory, it is understood that the ion exchange membrane 100 manufactured according to the method disclosed herein includes many more ion channels, which are pathways for ions, than the porous substrate 110. Accordingly, the ion exchange membrane has high permeability for effective ions and a low cross-over between electrolyte solutions for other than the effective ions. As used herein, the term "effective ions" refers to an electrolyte component that permeates the ion exchange membrane to enable the charge and discharge function of the redox flow battery described below.

The ion exchange membrane may be used with the non-aqueous electrolyte solution.

An ion exchange membrane optimized for an aqueous electrolyte solution has a high electrical resistance in the non-aqueous electrolyte solution. However, the ion exchange membrane disclosed herein may have an electrical resistance of about 2.5 $\Omega \cdot cm^2$ or less, for example, an electrical resistance of about 2 $\Omega \cdot cm^2$ or less, e.g., 0.1 to 2.5 $\Omega \cdot cm^2$, or 1 to 2.5 $\Omega \cdot cm^2$, or 1 to 2.5 $\Omega \cdot cm^2$, in the non-aqueous electrolyte solution.

The ion exchange membrane may have a thickness of about 20 μm to about 100 μm, for example, about 28 μm to about 40 μm.

Hereinafter, the redox flow battery is disclosed in further detail with reference to FIG. 2.

Figure 2:
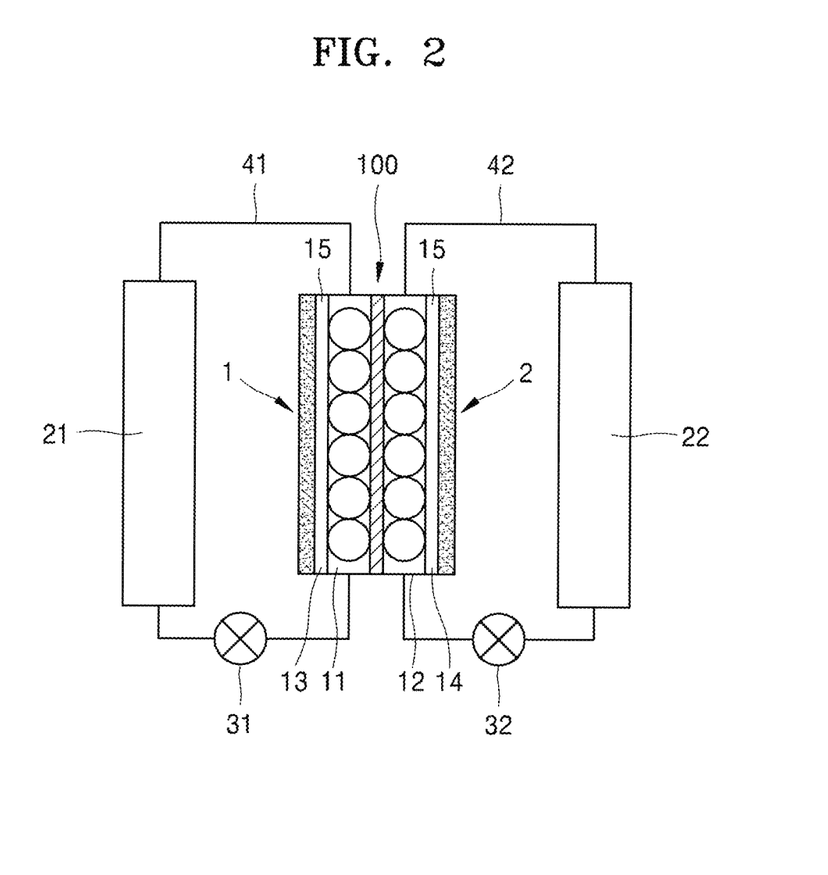
FIG. 2 schematically illustrates an embodiment of a redox flow battery.

Referring to FIG. 2, the redox flow battery according to an embodiment includes a cathode cell 1, an anode cell 2, an ion exchange membrane 100 disposed between the cathode and anode cells 1 and 2, and tanks 21 and 22 in fluid communication with the cathode and the anode cells 1 and 2.

The cathode cell 1 includes a bipolar plate 15, a cathode 13, and a catholyte 11.

The anode cell 2 includes the bipolar plate 15, an anode 14, and an anolyte 12.

The bipolar plate 15 contacts the cathode 13 and the anode 14 on an external surface of the cathode cell 1 and the anode cell 2, respectively, such that an electrical current flows externally from each cell. The bipolar plate 15 may be formed of a carbonaceous material. The carbonaceous material may comprise a carbon-based material or a graphite-based material, and examples of the carbon-based material include carbon black, hard carbon, soft carbon, petroleum coke, and carbon fiber, and examples of the graphite-based material include natural graphite, artificial graphite, graphitized carbon fiber, and graphitized mesocarbon microbeads.

The cathode 13 and the anode 14 may each be a carbon felt, a carbon fiber, or a carbon sheet. Alternatively, at least one of the cathode 13 and the anode 14 may comprise a metal having a porous structure.

The metal may be aluminum (Al), copper (Cu), titanium (Ti), a titanium alloy, nickel (Ni), or a nickel alloy, for example, an alloy of copper (Cu) or nickel (Ni). The metal having the porous structure has numerous pores formed on surface and on the inside thereof, and thus, the electrolyte may flow through the pores. The metal having the porous structure may have a porosity of about 75% to about 98%, and a size of the pores may be about 0.45 millimeters (mm) to about 5 mm. A size and a thickness of the cathode and the anode formed of the metal and having a porous structure may be suitably selected according to the desired performance of battery, but the thickness thereof may be about 3 mm to about 10 mm to prevent electrolyte leakage.

When the cathode and/or anode is formed of the metal having a porous structure, the manufacturing cost may be reduced and a flow of the electrolyte may be easy even when a highly viscous electrolyte solution is used, due to a high affinity to the non-aqueous electrolyte solution.

At least one of the catholyte 11 and the anolyte 12 may be an organic electrolyte solution.

The organic electrolyte solution may include a non-aqueous solvent, a supporting electrolyte, and a metal salt.

The non-aqueous solvent acts as a medium through which ions participating in an electrochemical reaction of the battery may move, and may be any suitable non-aqueous solvent. Examples of the non-aqueous solvent include dimethyl acetamide, diethyl carbonate, dimethyl carbonate, acetonitrile, γ-butyrolactone ("GBL"), propylene carbonate ("PC"), ethylene carbonate ("EC"), N-methyl-2-pyrrolidone ("NMP"), fluoroethylene carbonate, N,N-dimethylacetamide, and adiponitrile ("ADPN"). The non-aqueous solvent may be used alone or as a combination comprising at least one of the foregoing.

The supporting electrolyte does not directly participate in a reaction and maintains a charge balance between the catholyte and the anolyte. Such supporting electrolyte may include at least one compound selected from $LiBF_4$, $LiPF_6$, $LiClO_4$, $LiCF_3SO_3$, $Li(CF_3SO_2)_2N$, triethylamine tetrafluoroborate ("TEABF$_4$"), 1-ethyl-2-methyl pyrazol ium tetrafluoroborate ("EMPBF$_4$"), spiro-(1,1')-bipyrrolidium tetrafluoroborate ("SBPBF$_4$"), piperidine-1-spiro-1'-pyrrolidinium tetrafluoroborate ("PSPBF$_4$"), tributylamine tetrafluoroborate ("TBABF$_4$"), and lithium bis(trifluoromethanesulfonyl)imide ("LiTFSI").

The metal salt may include a metal-ligand coordination compound and a counter anion thereof.

A metal in the metal-ligand coordination compound may be at least one selected from the group consisting of iron (Fe), nickel (Ni), cobalt (Co), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

A ligand in the metal-ligand coordination compound may be at least one selected from dipyridyl, terpyridyl, ethylenediamine, propylenediamine, phenanthroline, and 2,6-bis(methyl imidazole-2-ylidene)pyridine.

The metal-ligand coordination compound may include at least one compound represented by the formulas:

A counter anion of the metal-ligand coordination compound may be $BF_4^-$, $PF_6^-$, $CF_3SO_3^-$, or $(CF_3SO_2)_2N^-$.

The ion exchange membrane 100 may be a cation exchange membrane or an anion exchange membrane. The ion exchange membrane 100 may be the same as the ion exchange membrane disclosed herein.

The cathode tank 21 stores the catholyte 11 and is in fluid communication with the cathode cell 1 through a pipe 41. Likewise, the anode tank 22 stores the anolyte 12 and is in fluid communication with the anode cell 2 through a pipe 42.

The catholyte 11 and the anolyte 12 circulate through respective pumps 31 and 32.

A principle of driving the redox flow battery is disclosed in Korean Patent Application KR 10-2011-0088881 that is incorporated herein in its entirety.

The redox flow battery may be used in various devices, such as an electric vehicle to provide a high capacity and high output, in addition to mobile phones and portable computers. Also, the redox flow battery may be combined with an internal-combustion engine, a fuel cell, a super capacitor, or the like to be used in a hybrid vehicle or the like. Also, the redox flow battery may be used for other purposes that benefit from a high output and high voltage.

Hereinafter, embodiments will be described in further detail, but the present disclosure is not limited thereto.

EXAMPLES

Manufacturing an Ion Exchange Membrane

Manufacturing Example 1

1-allyl-3-butylimidazolium-$BF_4$ ("ABIMBF$_4$") and N,N-dimethylacrylamide ("DMAA") were mixed at a molar ratio of 1:1 and benzophenone was added thereto as a light polymerization initiator at a concentration of 2 wt %, based on a total weight of the entire composition to prepare a composition for forming an ion exchange membrane. A porous substrate (Highpore having a film thickness of 25 μm, available from Asahi Kasei Chemicals) was washed with acetone solution, and then dried in a drying oven at a temperature of 80° C. for three hours. After immersing the porous substrate in the composition for forming the ion exchange membrane, which was being agitated, the porous substrate was maintained therein for about three hours to about five hours, such that the composition for forming the ion exchange membrane was sorped onto the porous substrate. After taking out the sorped porous substrate from the composition for forming the ion exchange membrane, the porous sorped substrate was irradiated with light at room temperature by using a 1 kW UV lamp for 15 minutes to polymerize the monomers, and then the result was washed with propylene carbonate ("PC") to obtain an ion exchange membrane.

Manufacturing Example 2

An ion exchange membrane was obtained in the same manner as in Manufacturing Example 1, except that a molar ratio of $ABIMBF_4$ and DMAA was changed to 1:2.

Manufacturing Example 3

An ion exchange membrane was obtained in the same manner as in Manufacturing Example 1, except that a molar ratio of $ABIMBF_4$ and DMAA was changed to 1:3.

Manufacturing Example 4

An ion exchange membrane was manufactured in the same manner as in Manufacturing Example 1, except that N,N'-methylene bis(acrylamide) was added in an amount of 6 wt % based on a total weight of $ABIMBF_4$ and DMAA, as a cross-linking agent, to prepare a composition for forming an ion exchange membrane.

Manufacturing Example 5

An ion exchange membrane was manufactured in the same manner as in Manufacturing Example 4, except that ethylene glycol dimethacrylate was used as a cross-linking agent.

Manufacturing Example 6

An ion exchange membrane was manufactured in the same manner as in Manufacturing Example 4, except that 1,6-hexanediol dimethacrylate was used as a cross-linking agent.

Manufacturing Example 7

An ion exchange membrane was manufactured in the same manner as in Manufacturing Example 4, except that 1,3-butanediol dimethacrylate was used as a cross-linking agent.

Manufacturing Example 8

An ion exchange membrane was manufactured in the same manner as in Manufacturing Example 4, except that bisphenol A dimethacrylate was used as a cross-linking agent.

Manufacture of a Redox Flow Battery

Example 1

An electrode prepared by heat treating a carbon felt (GF20-3, thickness: 3 mm, size: 5 cm×5 cm, available from Nippon Graphite) in air atmosphere at a temperature of 500° C. for 5 hours was used to prepare a cathode and an anode.

A graphite bipolar plate having a thickness of 1 cm, cut into a size of 7 cm×7 cm was used as a bipolar plate.

The ion exchange membrane (including $ABIMBF_4$: DMAA at a molar ratio of 1:1 and bisphenol A dimethacrylate as a cross-linking agent) of Manufacturing Example 8 was used as an ion exchange membrane.

Also, 0.2 molar (M) $Fe(bipyridine(bpy))_3(N(CF_3SO_2)_2)_2$ dissolved in a mixture solvent of PC/3-methoxypropionitrile (MPN) (a weight ratio of 1:1) was used as a catholyte, and 0.2 M $CO(bpy)_3(N(CF_3SO_2)_2)_2$ dissolved in a mixture solvent of PC/MPN was used as an anolyte.

In greater detail, an insulator (a Teflon film), a current collector (a gold plate), and the bipolar plate were stacked on a nut-integrated end plate. Subsequently, the square carbon felt electrode having a size of 5 cm×5 cm was cut in half to obtain two rectangular electrodes, and one of the two rectangular electrodes was then inserted into a concave of the bipolar plate to manufacture a cathode cell. The same method described above was used to manufacture an anode cell by using the other rectangular electrode. Thereafter, 3 mL of the catholyte were injected into the cathode cell to complete the cathode cell. Also, 3 mL of the anolyte were injected into the anode cell to complete the anode cell. Thereafter, the cathode cell and the anode cell were disposed facing each other, and four bolts, in which belleville springs were inserted, were pierced through the two cells, and then the bolts were tightened in a diagonal sequence using a torque wrench until the torque reached 1.5 newton-meters (Nm) to assemble the same. After completing the assembly, each electrolyte solution was injected into an injection hole of each electrode, and the injection hole was blocked by using a Teflon bolt to complete the redox flow battery.

Comparative Example 1

The same as carbon felt that used in Example 1 was used as a cathode and an anode electrode, the same as graphite bipolar plate that used in Example 1 was used as a bipolar plate, and Nafion® which is a cation exchange membrane was used as an ion exchange membrane, and 0.2 M $Fe(bpy)_3(BF_4)_2$ dissolved in a mixture solvent of PC/0.5 M $TEABF_4$ (0.5 M $TEABF_4$ in PC) were used as a catholyte, and 0.2 M $CO(bpy)_3(BF_4)_2$ dissolved in a mixture solvent of PC/0.5 M $TEABF_4$ were used as an anolyte to manufacture a redox flow battery in the same manner as in Example 1.

EVALUATION EXAMPLE

Evaluation Example 1: Surface Analysis of an Ion Exchange Membrane

FIG. 3 is a scanning electron microscope ("SEM") image of the porous substrate and the ion exchange membrane of Manufacturing Example 8, used in Example 1. FIG. 3A is a cross-sectional image of the porous substrate and FIG. 3B is a surface image of the porous substrate. FIG. 3C is a cross-sectional image of the ion exchange membrane and FIG. 3D is a surface image of the ion exchange membrane.

Figure 3A:
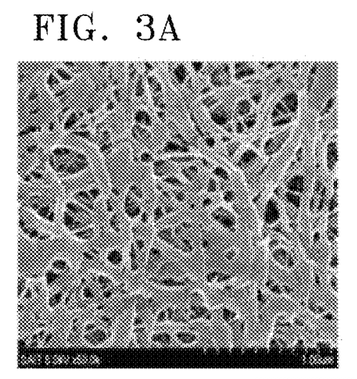
FIGS. 3A to 3D are a scanning electron microscope ("SEM") image of a porous substrate and ion exchange membrane of Manufacturing Example 8.
Figure 3B:
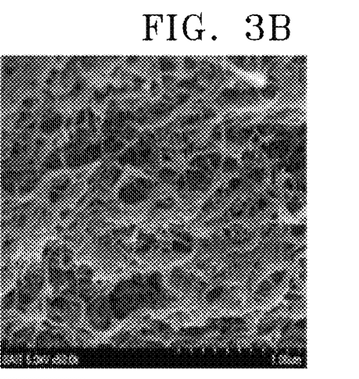
Figure 3C:
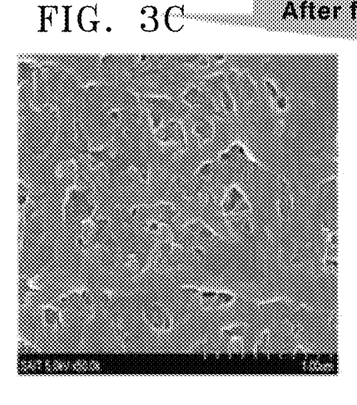
Figure 3D:
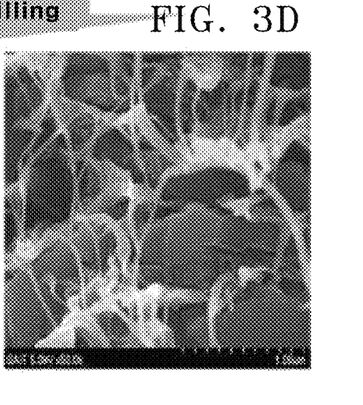

Referring to FIG. 3, pores of the porous substrate shown in FIG. 3A and FIG. 3B are filled with a polymer prepared from the composition for forming the ion exchange membrane to form the ion exchange membrane shown in FIG. 3C and FIG. 3D.

Evaluation Example 2: Evaluation of Properties of the Ion Exchange Membrane

The ion exchange membranes (hereinafter, ion exchange membranes A to H) manufactured in Manufacturing Examples 1 to 8 and commercially available anion exchange membranes AMX (available from Fumatech) (hereinafter, comparative ion exchange membranes) were used to measure water swelling ratio ("WSR"), ion exchange capacity ("IEC"), and electrical resistance in an aqueous solvent and a non-aqueous solvent of each ion exchange membrane by using the method described below. The results are shown in Table 1.

WSR Analysis

A weight of each of dried ion exchange membranes ($W_{dry}$) was measured, and the dried exchange membrane was then immersed in distilled water until the dried exchange membrane reached an equilibrium state, moisture on a surface of the membrane was removed, and a weight of the wet ion exchange membrane ($W_{wet}$) was measured.

The WSR was measured according to Equation 1:

$$WSR(\%) = (W_{wet} - W_{dry})/W_{dry} \times 100 \quad \text{Equation 1}$$

Ion Exchange Capacity Analysis

An ion exchange capacity was measured by using argentimetry. In greater detail, first, 100 milligrams (mg) of a sample (each ion exchange membrane) were prepared. In this regard, if chromaticity of the sample was high, 3 mL of $Al(OH)_3$ were added to the sample, followed by agitation, immersion, and filtration. Thereafter, pH of the sample was adjusted to a range of 7 to 8, and 1 ml of $K_2CrO_4$ (a yellow indicator) was added to the sample. The sample was titrated with $AgNO_3$, and an ion exchange capacity was calculated from an amount of $AgNO_3$ that was used until the indicator reached a pinkish yellow end point.

Analysis of Electrical Resistance in an Aqueous Solvent

The ion exchange membranes were each immersed in a 0.5M NaCl aqueous solution and let to reach an equilibrium state. Thereafter, a clip cell connected to an impedance analyzer (Solartron 1260 impedance spectroscopy available from Solartron Analytical and a range of frequency measured: 0.1 Hertz (Hz) to 1 megaHertz (MHz) was filled with the 0.5 M NaCl aqueous solution to measure electrical resistance ("Rs"). Thereafter, the ion exchange membrane was inserted into the clip cell to measure electrical resistance ("Rm"). Ion conductivity was calculated by subtracting Rs from Rm.

Analysis of Electrical Resistance in a Non-Aqueous Solvent

An electrical resistance was measured in a non-aqueous solvent in the same manner as described above with respect to the aqueous solvent described above, except that 0.5M $TEABF_4$ solution was used instead of 0.5M NaCl aqueous solution.

TABLE 1

| Ion exchange membrane | Thickness (μm) | WSR (%) | ions exchange capacity (meq/g) | Electrical resistance (aqueous) (Ω · cm²) | Electrical resistance (non-aqueous) (Ω · cm²) |
|---|---|---|---|---|---|
| A | 26 | 48.80 | 1.25 | 1.446 | 1.25 |
| B | 21 | 38.84 | 0.92 | 2.051 | 2.18 |
| C | 26 | 38.84 | 0.88 | 2.135 | 2.69 |
| D | 26 | 26.51 | 1.20 | 1.546 | 1.754 |
| E | 26 | 24.12 | 1.15 | 1.682 | 1.784 |
| F | 26 | 22.35 | 1.11 | 1.874 | 1.992 |
| G | 26 | 25.34 | 1.18 | 1.598 | 1.721 |
| H | 26 | 21.56 | 1.05 | 2.023 | 2.542 |
| comparison | 135 | 21.08 | 1.40 | 3.24 | 28.04 | ion exchange membrane A) $ABIMBF_4$:DMAA = 1:1 (molar ratio)
ion exchange membrane B) $ABIMBF_4$:DMAA = 1:2 (molar ratio)
ion exchange membrane C) $ABIMBF_4$:DMAA = 1:3 (molar ratio)
ion exchange membrane D) $ABIMBF_4$:DMAA = 1:1 (molar ratio) + N,N'-methylene bis(acrylamide)
ion exchange membrane E) $ABIMBF_4$:DMAA = 1:1 (molar ratio) + ethylene glycol dimethacrylate
ion exchange membrane F) $ABIMBF_4$:DMAA = 1:1 (molar ratio) + 1,6-hexanediol dimethacrylate
ion exchange membrane G) $ABIMBF_4$:DMAA = 1:1 (molar ratio) + 1,3-butanediol dimethacrylate
ion exchange membrane H) $ABIMBF_4$:DMAA = 1:1 (molar ratio) + bisphenol A dimethacrylate Referring to Table 1 above, the ion exchange membranes A to H showed lower electrical resistance than the comparative ion exchange membranes. In particular, the ion exchange membrane according to an embodiment showed an electrical resistance that is about 20 times as low as the comparative ion exchange membrane. In this regard, it may be concluded that when the ion exchange membrane including the cross-linking agent is used, the WSR value may decrease and thereby ion selectivity of the ion exchange membrane may increase.

As described above, according to the above embodiments, the ion exchange membrane according to an embodiment may have ion mobility and film properties suitable for use with the non-aqueous electrolyte. Also, the redox flow battery including the ion exchange membrane has advantages such as high charge and discharge efficiency, voltage efficiency, and energy efficiency.

It should be understood that the exemplary embodiments described herein should be considered in a descriptive sense only and not for purposes of limitation. Descriptions of features, advantages, or aspects within each embodiment should typically be considered as available for other similar features, advantages, or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. An anion exchange membrane for a redox flow battery, the anion exchange membrane comprising
   a porous substrate; and
   a polymer disposed in the porous substrate,
   wherein the polymer is a polymerization product of a composition for forming an ion exchange membrane, wherein the composition comprises a first monomer and a second monomer,
   wherein the first monomer is substituted with a group comprising an ethylenic unsaturated double bond and comprises a cationic heterocyclic compound comprising a nitrogen heteroatom and a counter anion thereof,
   wherein the cationic heterocyclic compound is an imidazolium compound represented by Formula 1 below:

Formula 1 wherein $R^1$ to $R^5$ are each independently hydrogen, a C1-C10 alkyl group, or a C2-C10 alkenyl group, wherein one of $R^2$ and $R^3$ is a C1-C10 alkyl group, and wherein an other of $R^2$ and $R^3$ is a C2-C10 alkenyl group, and wherein the second monomer is polymerizable with the first monomer and is at least one selected from a (meth)acrylamide compound and a (meth)acrylate compound.

2. The anion exchange membrane of claim 1, wherein $R^1$, $R^4$, and $R^5$ are each hydrogen.

3. The anion exchange membrane of claim 1, wherein the counter anion is at least one selected from $BF_4^-$, $Cl^-$, $Br^-$, $I^-$, $SO_4^-$, $PF_6^-$, $ClO_4^-$, $CF_3SO_3^-$, $(CF_3SO_2)_2N^-$, and $(C_2F_5SO_2)_2 N^-$.

4. The anion exchange membrane of claim 1, wherein an amount of the second monomer is about 0.5 moles to about 4 moles, based on 1 mole of the first monomer.

5. The anion exchange membrane of claim 1, wherein the composition for forming the ion exchange membrane further comprises a cross-linking agent.

6. The anion exchange membrane of claim 5, wherein the cross-linking agent is at least one selected from a bis((meth)acrylamide) compound and a di(meth)acrylate compound.

7. The anion exchange membrane of claim 5, wherein an amount of the cross-linking agent is less than 10 weight percent, based on a total weight of the monomers in the composition for forming the ion exchange membrane.

8. The anion exchange membrane of claim 1, wherein the composition for forming the ion exchange membrane further comprises at least one of a solvent and a polymerization initiator.

9. The anion exchange membrane of claim 1, wherein the porous substrate comprises at least one compound selected from a polyolefin, a polytetrafluoroethylene, a polyetheretherketone, a polysulfone, a polyimide, and a polyamideimide.

10. The anion exchange membrane of claim 1, wherein a thickness of the porous substrate is 50 micrometers or less.

11. A redox flow battery comprising:
a cathode cell comprising a cathode and a catholyte;
an anode cell comprising an anode and an anolyte; and
the anion exchange membrane according to claim 1,
wherein the anion exchange membrane is disposed between the cathode cell and the anode cell.

* * * * *